United States Patent
Antes et al.

(10) Patent No.: US 11,227,484 B2
(45) Date of Patent: Jan. 18, 2022

(54) CONTROL UNIT FOR A REMOTE CONTROL COMPRISING AN ACTIVATION SENSOR WITH A VARIABLE EFFECTIVE SENSOR RANGE

(71) Applicant: Brendel Holding GmbH & Co. KG, Crailsheim (DE)

(72) Inventors: Jochen Antes, Ilshofen (DE); Friederike Brendel, Ilshofen (DE)

(73) Assignee: BRENDEL HOLDING GMBH & CO. KG, Crailsheim (DE)

( * ) Notice: Subject to any disclaimer, the term of this patent is extended or adjusted under 35 U.S.C. 154(b) by 71 days.

(21) Appl. No.: 16/561,097

(22) Filed: Sep. 5, 2019

(65) Prior Publication Data
US 2020/0082709 A1 Mar. 12, 2020

(30) Foreign Application Priority Data
Sep. 5, 2018 (DE) ...................... 10 2018 215 066.4

(51) Int. Cl.
*G08C 17/02* (2006.01)
*G01V 3/08* (2006.01)
*G05B 15/02* (2006.01)

(52) U.S. Cl.
CPC .............. *G08C 17/02* (2013.01); *G01V 3/08* (2013.01); *G05B 15/02* (2013.01); *G08C 2201/30* (2013.01)

(58) Field of Classification Search
CPC ....... E02F 9/2012; E02F 9/205; E02F 9/2004; E02F 9/24; G01V 3/08; G05B 15/02;
(Continued)

(56) References Cited

U.S. PATENT DOCUMENTS 8,730,166 B2 * 5/2014 Larsen .................. A63F 13/218
345/161
9,606,668 B2 * 3/2017 Hotelling .............. G06F 3/0488
(Continued)

FOREIGN PATENT DOCUMENTS

WO 2018094436 A1 5/2018

OTHER PUBLICATIONS

European Application No. EP19195559.0, "Extended European Search Report", dated Jan. 23, 2020, 7 pages.

*Primary Examiner* — Yong Hang Jiang
(74) *Attorney, Agent, or Firm* — Kilpatrick Townsend & Stockton LLP

(57) ABSTRACT

A control unit for a remote control for controlling a machine, comprising: a processor device, at least one manually operable operating element provided on the control unit for controlling at least one machine function, which can be switched by the processor device between an activated state (b) and a deactivated state (a), and an activation sensor assigned to the operating element, which activation sensor comprises an effective sensor range and is adapted to detect a defined approach to the effective sensor range by an operator, the processor device being adapted to switch the operating element to the activated state (b) if the activation sensor detects the defined approach to the effective sensor range, and if no defined approach is detected during a preset period of time, to switch the operating element to the deactivated state, the control unit being adapted in such a way that operation of the operating element does not cause the machine function to be activated, as long as the operating element is in the deactivated state (a), and a position or/and size of the effective sensor range on the control unit being variable.

20 Claims, 2 Drawing Sheets

Figure 1:
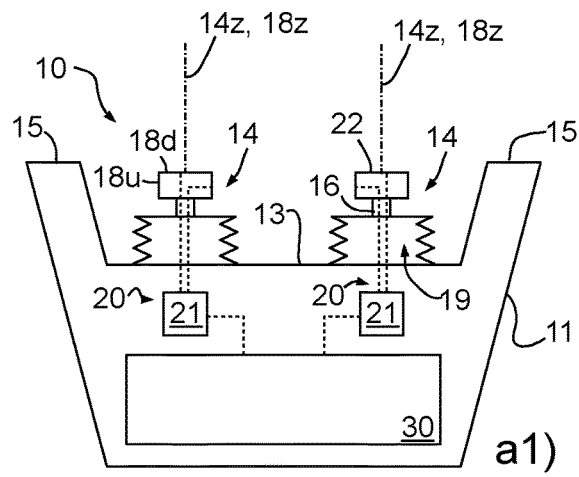
Figure 1:
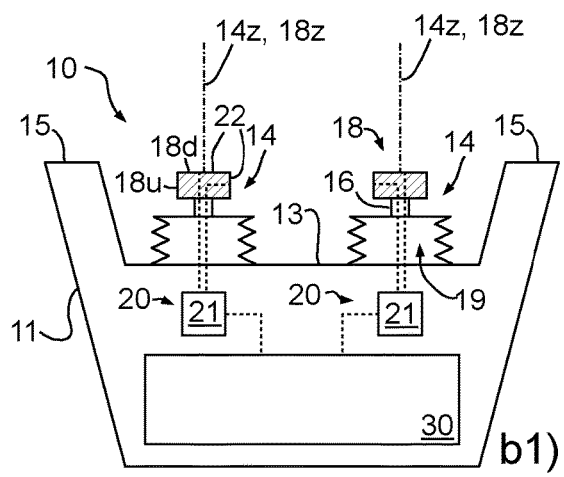
Figure 1:
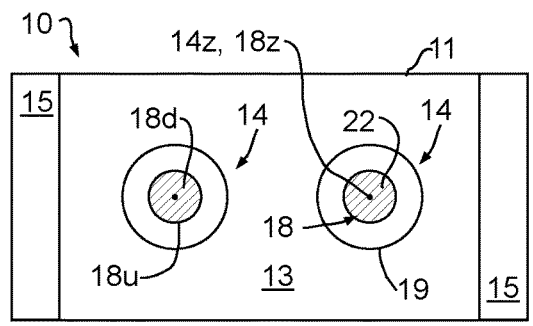
Figure 1:
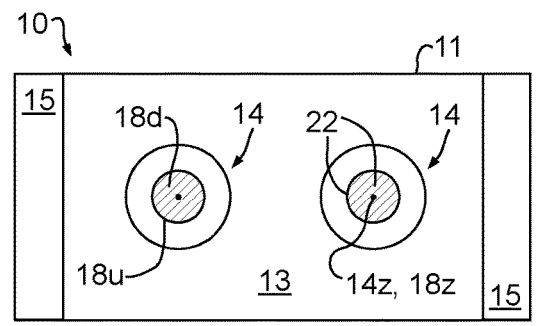
Figure 1:
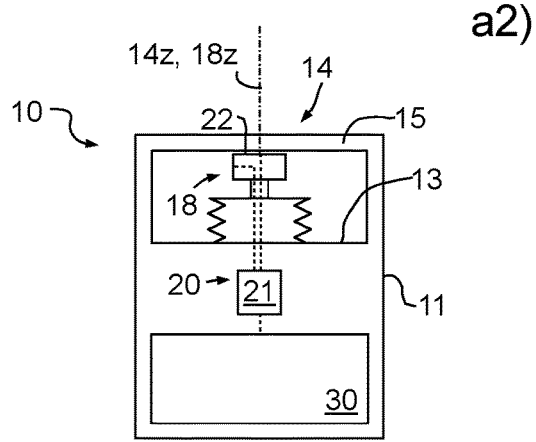
Figure 1:
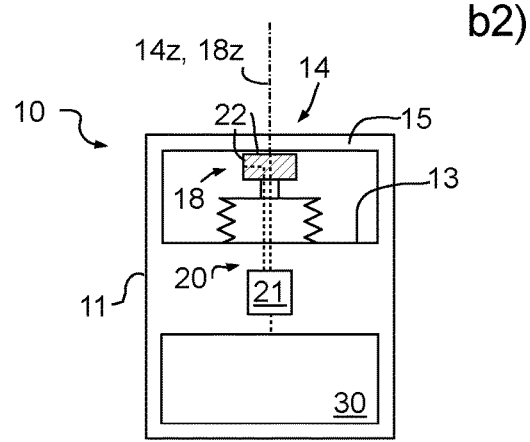

(58) Field of Classification Search
CPC ........ G05B 19/042; G05B 2219/36163; G05G
2009/04774; G05G 5/28; G05G 9/047;
G08C 17/02; G08C 2201/30; H01H
2003/0293; H01H 2239/006; H01H
2300/022; Y10T 74/2003; Y10T 74/2014;
Y10T 74/20201; Y10T 74/20612
See application file for complete search history.

(56) References Cited

U.S. PATENT DOCUMENTS

| | | | |
|---|---|---|---|
| 10,088,915 B2* | 10/2018 | Drum | G05G 9/047 |
| 2004/0011154 A1 | 1/2004 | Dybro | |
| 2007/0119698 A1* | 5/2007 | Day | G06F 3/044 |
| | | | 200/510 |
| 2009/0262073 A1* | 10/2009 | Rigazio | H04N 21/42224 |
| | | | 345/158 |
| 2016/0236914 A1* | 8/2016 | Persico | B66C 13/40 |

* cited by examiner a2) b2)

a3) b3)

(a) (b)

a1)

b1)

a2)

b2)

a3)

b3)

(a)            (b)

CONTROL UNIT FOR A REMOTE CONTROL COMPRISING AN ACTIVATION SENSOR WITH A VARIABLE EFFECTIVE SENSOR RANGE

CROSS REFERENCE TO RELATED APPLICATION

This application claims priority to German Patent Application No. 10 2018 215 066.4, filed in Germany on Sep. 5, 2018, the entire contents of which are hereby incorporated herein by this reference.

The present invention relates to a control element with the features of the generic term of claim 1 for a remote control for controlling a machine, preferably a radio remote control.

Such a generic control element comprises a processor device, at least one manually operable operating element for controlling at least one machine function, which can be switched between an activated state and a deactivated state by the processor device, and an activation sensor which is assigned to the operating element, comprises an effective sensor range and is arranged to detect a defined approach to the effective sensor range by a body part of an operator, preferably by at least one finger or one hand.

The processor device is adapted to switch the operating element to the activated state if the activation sensor detects the defined approach to the effective sensor range and to switch the operating element to the deactivated state when no defined approach to the effective sensor range is detected by the activation sensor during a preset period of time.

The generic control element is configured in such a way that operating the operating element does not control the machine function as long as the operating element is in the deactivated state.

This is to prevent unintentional startup of the machine function due to carelessness or incorrect operation, which may be particularly necessary when controlling critical machine functions such as movement functions of a crane system or when working with people working in the immediate vicinity of the machine being controlled. The aforementioned activation or release mechanism for the operating element thus increases the safety of the machine.

Common machine solutions for an activation sensor or activation switch are mechanical foot switches or activation buttons on or in the operator's platform of a machine. Such solutions are also known as dead man devices.

When a machine is operated via a remote control, buttons or switches are known to activate an operating element, which can be provided as an independent element on the control element of the remote control or, for example, integrated directly in a master switch in a roll bar or for activating master switch commands.

The integration and reaction of the (radio) control system and the resulting options for activating a machine function are often freely programmable and can be adapted to different applications.

Particularly in the case of long periods of operation, however, the activation of a critical machine function by permanently pressing a button or switch intended for this purpose is not ergonomic and can lead to fatigue and/or a reduction in the efficiency of the machine operator.

To improve ergonomics, it is already known to use activation sensors which detect a defined approach to an effective sensor range without having to exert any appreciable pressure on it or without mechanical actuation. Working with such activation sensors is generally found to be much more comfortable and less tiring.

It is known to use capacitive sensors for this purpose, for example, whose status or signal can be evaluated by means of the processor device.

Release or activation of an operating element to control a machine function is based on the detection of a capacity change of a sensor field when approached or touched by a body part of the operator. This is possible because the human body has an individual capacity.

However, the use of such activation sensors entails the risk that an accidental touch may result in unintentional activation, for example when transporting the control element or when actuating another, adjacent operating element, which in turn counteracts the intended increase in machine safety.

Thus, in order to guarantee the safety of the machine, it must be ensured that unintentional activation is excluded as far as possible, even in the case of the more comfortable solution for the operator, by largely pressure-free contact or contact-free approach.

If necessary, very large distances must be selected between the individual operating elements on the control element. Alternatively, the sensors must be designed in such a way that only a very small effective sensor surface is detected as being touched, which in turn offers no noticeable ergonomic improvement compared to the variant with a mechanical button or switch.

Against this background, the object of this invention is to further develop the control element known from the prior art in such a way that a compromise with regard to ergonomics and occupational safety can be improved.

In accordance with the invention, it is suggested that a position or/and size of the effective sensor range on the control element can be changed.

In general, this makes it possible to adapt the effective sensor range for activating the operating element to the requirements of the individual case with regard to the needs and preferences of the operator as well as work and machine safety.

In particular, it may be provided that the position and/or size of the effective sensor range can be changed during operation of the remote control.

To further improve the aforementioned compromise, it may be particularly preferred that a configuration of the effective sensor range with regard to its position and/or size on the control element can be switched by the processor device between a basic configuration assigned to the deactivated state of the operating element and a working configuration different from the basic configuration assigned to the activated state of the operating element.

For this purpose, the processor device is further designed, e.g. by appropriate programming, to switch over the configuration of the effective sensor range to the configuration assigned to this state from the basic configuration and the working configuration during or after switching over the operating element to a state from the activated and the deactivated state.

The term switching is to be understood in such a way that an element is only switched to a state or a configuration in the sense of a change, if the corresponding element is not already in this state or this configuration anyway.

Thus, as long as the operating element is deactivated, the effective sensor range is in its basic configuration, in which the position and/or size of the effective sensor range can be selected in such a way that unintentional activation can be avoided with the greatest possible certainty, while during or after activation of the operating element the size and/or position of the effective sensor range can be set in the then effective working configuration in such a way that particularly ergonomic working is possible, for example by extending the effective sensor range to a range of the control element that is always touched by the operator during normal operation.

It should be noted that even if the operating element is in the activated state, it can be linked to one or more additional conditions if desired, whether operation of the operating element actually triggers the assigned machine function. If several activatable operating elements are provided, such an additional condition can consist, for example, in all these operating elements being in the activated state at the same time.

The activation sensor is preferably a capacitive sensor, whose effective sensor range can be changed by a corresponding PCB layout of the sensor surface or sensor surfaces and a control or programming of the sensor or the processor device in a variable way, and particularly preferably also during the operation of the sensor.

In principle, however, the use of other sensor types for the activation sensor should not be ruled out as long as these allow the effective sensor range to be changed with regard to size and position on the control element.

According to a preferred exemplary embodiment, the effective sensor range is an effective sensor surface. As a defined approach to the sensor surface, its touch or an approach to it at a given distance can then be detected, whereby a touch sensor or an approach sensor can be used as an activation sensor.

Alternatively, it is also possible to use a suitable activation sensor to detect penetration into a three-dimensional effective sensor range as a defined approach to it.

An improvement in operational safety can be achieved in a simple manner by at least partially, preferably completely, including the effective sensor range of the basic configuration in the effective sensor range of the working configuration, or by increasing the effective sensor range when switching from the basic configuration to the working configuration.

According to a preferred exemplary embodiment, it is provided that the operating element has a handle section with a distal cover surface and a peripheral surface with respect to a longitudinal axis of the handle section, wherein the effective sensor range of the basic configuration is formed by the distal cover surface or a partial area thereof, while the sensor range of the working configuration comprises at least one area of the peripheral surface and is preferably formed by the distal cover surface and the peripheral surface.

This solution is particularly advantageous for an operating element in the form of a rotary or joystick switch. With such an operating element, activation or release can take place by purposefully touching the distal cover surface, while normal operation of the operating element by turning the rotary switch or actuating the joystick automatically enables the activated state to be maintained by touching the peripheral surface.

Alternatively or additionally it may be provided that the control element comprises a handle adapted to be held or touched by the operator during operation, wherein the effective sensor range in the working configuration comprises at least one area of the handle, so that ergonomic working is possible. Such a handle may, for example, be designed as a roll bar or/and a carrying handle for transporting the control element.

If no defined approach to the effective sensor range is detected by the activation sensor during a preset period of time, the operating element is deactivated and the effective sensor range is returned to the basic configuration. In order to allow a comfortable reaching to the usual operating position of an operator's fingers after an initial activation of the operating element, it can be provided that the preset period of time lies between 0 and 5 seconds inclusive, preferably between 1 and 3 seconds inclusive.

In order to facilitate adaptation to different operators with different hand sizes and ergonomic preferences, it can be provided that the preset period of time and/or the effective sensor range can be set or modified by the operator.

In particular, it may be provided that the working configuration of the effective sensor range may be settable or modifiable by the operator.

For example, it is possible that in a separate learning process, an operator may carry out typical operating movements on the control element over a certain period of time and record which areas of the control element are normally touched by the current operator. The working configuration of the effective sensor range for this operator can then be set or modified accordingly.

In order to inform the operator of a change in the effective sensor range, it may be provided that the control element is further designed to output a signal to the operator when the configuration of the effective sensor range is changed or switched. For example, a vibration signal is appropriate.

For controlling a plurality of machine functions, it may be provided that the control unit comprise a plurality of control elements, each of which is associated with an activation sensor having an effective sensor range as described in connection with the generic control element. Preferably, the effective sensor range of at least two, several or all activation sensors can be changed with regard to position and/or size on the control element.

A configuration of the effective sensor range of at least two, several or all activation sensors with regard to its position and/or size on the control element by the processor device, switchable between a basic configuration assigned to the deactivated state of the respective control element and a working configuration different from the basic configuration and assigned to the activated state of the respective operating element, as described in connection with the explanation of claim 1, is particularly preferred.

Here it can preferably be provided that the control unit is adapted in such a way that an operation of any operating element only activates the respective machine function, if all control elements are in the activated state at the same time. This ensures, for example, that the control unit is always operated with both hands, if this is required for safety reasons.

In the following, the present invention is illustrated using two selected examples, which are shown in the enclosed figures.

Figure 2:
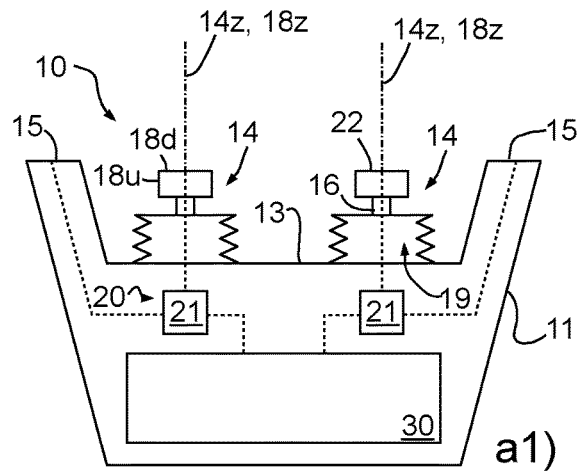
Figure 2:
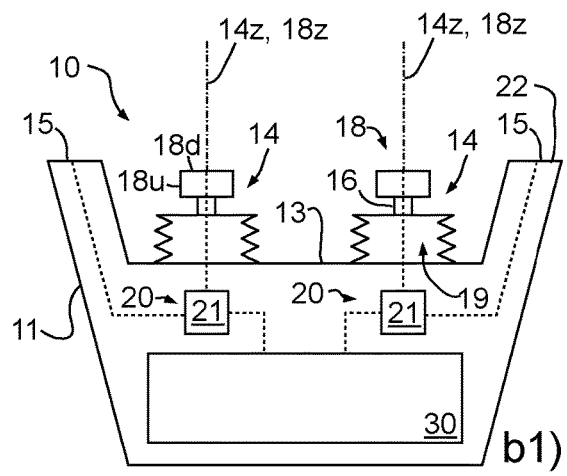
Figure 2:
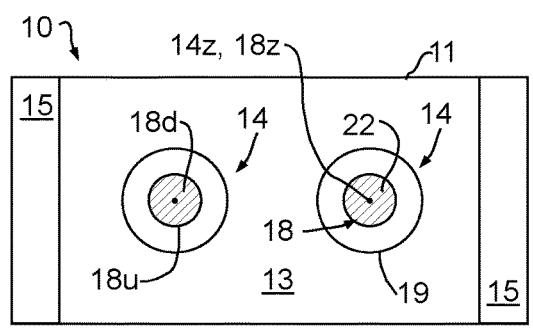
Figure 2:
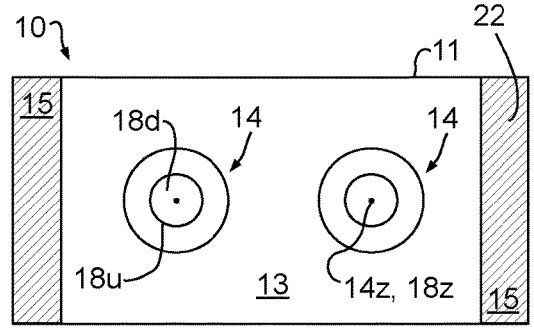
Figure 2:
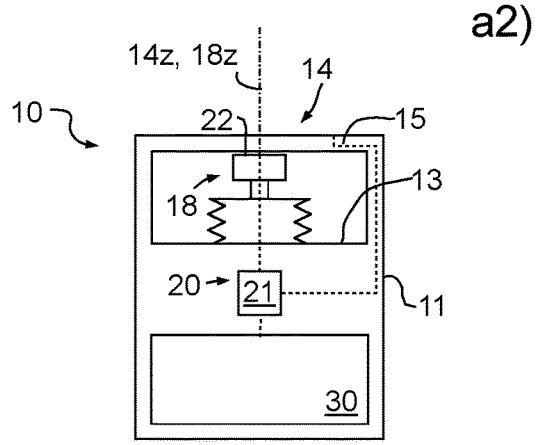
Figure 2:
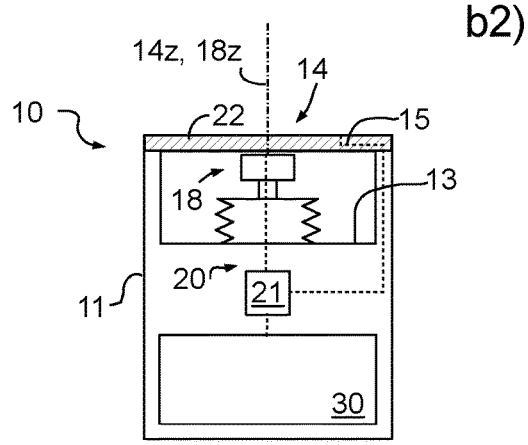

FIG. 1 shows in the partial illustrations a) and b) a control element according to a first exemplary embodiment of the present invention in each case in three views, i.e. from top to bottom in a front view (a1), b1)), a top view (a2), b2)) and a side view (a3), b3)), whereby partial illustration a) in each case shows the control unit in the deactivated state and the effective sensor range in the basic configuration, while partial illustration b) shows the operating element in the activated state and the effective sensor range in the working configuration in each case, and FIG. 2 shows in the partial illustrations a) and b) a control unit according to a second exemplary embodiment of the present invention, whereby the individual illustrations correspond in each case to those of FIG. 1.

It should be noted that the figures are highly simplified and schematized representations, which are primarily intended to illustrate the principle of the invention. In order not to overburden the figures, not all features in each individual figure have been provided with reference signs, but essentially only those that are necessary or helpful for understanding the figure description. This applies above all, if several similar elements are represented.

FIG. 1 shows a control panel 10 of a remote control according to a first exemplary embodiment for a machine not shown in more detail here, which could be a construction machine, a crane or an industrial plant, for example.

The control unit 10 comprises a housing 11 with a user interface 13, on which two operating elements 14 in the form of joystick switches are mounted here, which can be used to control various machine functions, such as lifting and swiveling movements of a crane system.

Of course, further operating and/or display elements can be provided on the control unit according to the respective requirements, which are not shown here for reasons of simplification.

If the control unit is a control unit of a radio remote control, the housing 11 contains a radio transmitter or communication device, which is not shown here and which is adapted to transmit control signals or commands to a receiving device installed on the machine and, if necessary, also to receive them from this device.

Since the operating elements 14 in this example have an identical structure, only one of the operating elements 14 is described in more detail below.

Each of the operating elements 14 comprises a lever section 16, which can be swiveled about two axes which run orthogonally to each other and each run parallel to the user interface 13, and which is also mounted on the housing 11 so as to be rotatable about its dashed dotted longitudinal axis 14z. It is therefore a 3-axis joystick switch. Such switches for the control of industrial plants or construction machines are also called master switches.

A bellows 19 protects the control unit 10 against penetration of dirt and foreign bodies into the mechanics and electronics contained in the housing 11.

A handle section 18 is formed at the distal end of the lever part 16, which has a distal cover surface 18d and a peripheral surface 18u with respect to its longitudinal axis 18z.

Furthermore, the control unit 10 comprises two laterally mounted and upwardly projecting, handle-like handles 15, which are also designed as roll bars here to prevent unintentional deflection of the operating elements 14 when the control unit 10 falls to the floor.

In this example, the shape and dimensions of the aforementioned components of the control unit 10 are preferably chosen in such a way that the two operating elements 14 can each be operated with the thumb and index finger and, if desired, the middle finger of one hand, while the handles 15 can each be held with the other fingers or the ball of the thumb can rest on an upper cover surface of the handles 15, for example when the control unit 10 is carried in the manner of a vendor's tray on a carrying strap in front of the body, which is not shown further here.

The housing 11 contains a processor device 30, only schematically shown here, which, among other things, can be used to convert the movement or deflection of the operating elements 14 into control signals for controlling the various machine functions.

The processor device 30 is connected to the control elements 14 by way of data transmission and, if necessary, to the radio transmission or communication device in a way which is known but not shown here. It can, for example, be designed as a microcontroller.

In order to minimize the risk of an unintentional activation of the machine functions, the operating elements 14 can each be switched by the processor device 30 between a deactivated state (partial image a) and an activated state (partial image b), wherein the control unit 10 and in particular the processor device 30 is set up in such a way that an operation of the operating element 14 does not cause the associated machine function to be activated, as long as the operating element 14 is in the deactivated state.

An activation sensor 20 is assigned to each of the operating elements 14 for this purpose, the activation sensor 20 comprising an effective sensor range 22 which is hatched in the figures in each case and adapted to detect a defined approach to the effective sensor range 22 by, for example, a finger or a hand of an operator.

The activation sensor 20 can preferably be a capacitive touch sensor, whereby the defined approach to the effective sensor range 22 can consist of touching it, for example, with a finger. However, it is also possible that the defined approximation is to approach the effective sensor range 22 at a specified distance, for example with a finger or hand.

There is a communication or data transmission connection between each activation sensor 20 or its sensor electronics 21, which is only indicated here as a block, and the processor device 30, which is indicated in the figures by a dashed line.

In the same way, the connection between the sensor electronics 21 of the activation sensor 20 and its effective sensor range 22 is indicated, which can, for example, be defined by a measuring electrode of a capacitive sensor.

If a defined approach is detected while the operating element 14 is in the deactivated state, the processor device 30 causes the control element 14 to be switched to the activated state.

As long as the defined approach continues, the operating element 14 remains in the activated state, and only if no defined approach is detected over a preset period of time, is the operating element 14 switched back to the deactivated state, in which control of the machine functions is blocked.

According to the invention, the position and/or size of the effective sensor range 22 on the control unit 10 can be changed, as illustrated by a comparison of the hatched areas in the partial illustrations a) and b).

More precisely, partial illustration a) shows the operating element in the deactivated state and the effective sensor range in the basic configuration, partial illustration b) the operating element in the activated state and the effective sensor range in the working configuration respectively.

In the first exemplary embodiment, the effective sensor range 22 in the basic configuration is formed only by the distal cover surface 18d of the handle section 18, in the working configuration by the distal cover surface 18d and the peripheral surface 18u.

The risk of unintentional activation is reduced by the fact that the relatively small cover surface 18d has to be touched in order to activate the operating element 14 from the deactivated state, which is also oriented in only one direction (upwards).

However, keeping one finger constantly on the cover surface 18d while controlling the operating element 14 would be uncomfortable and tedious in the long run. Therefore, upon or after activation of the operating element 14 by touching the cover surface 18d, the effective sensor range 22 of the associated activation sensor 20 is switched to the working configuration, so that the operating element 14 remains in the activated state, as long as the handle section 18 is touched at any point of the cover surface 18*d* and the peripheral surface 18*e*.

Only when no approach to the effective sensor range 22 in the working configuration is detected over a preset period of time does the processor device 30 cause the operating element 14 to be set to the deactivated state and the effective sensor range 22 to be set back to the basic configuration.

FIG. 2 illustrates a slightly modified second exemplary embodiment, where features of the second exemplary embodiment corresponding to those of the first are each provided with the same reference signs as the corresponding features of the first exemplary embodiment.

The second exemplary embodiment is also described only to the extent that it differs from the first, to whose above description reference is otherwise made.

The control unit 10 in FIG. 2 only differs from that in FIG. 1 in that, for each operating element 14, the effective sensor range 22 in the working configuration, as shown in partial illustration (b), is formed by the outer surfaces of the handle 15, while in the basic configuration (partial illustration (a)), as in the first exemplary embodiment, it is formed by the distal cover surface 18*d* of the handle section 18 of the associated operating element 14.

In this way it is ensured that during transport a machine function is not unintentionally activated by carrying the control unit on the handles 15, but that a permanent ergonomic working is possible after an initial activation.

Provided that the corresponding sensor elements of the activation sensor 20 are provided both in handle 15 and in the peripheral surface 18*d*, it would also be possible for the operator to set whether the effective sensor range should be used in the working configuration according to FIG. 1 or FIG. 2 for a given control unit.

It should be added that, if desired, it may be planned to program the processor device 30 in each of the exemplary embodiments in such a way that an operation of each of the two operating elements 14 only activates the respective machine function, if both operating elements 14 are simultaneously in the activated state, so that it is ensured that the control unit 10 is always operated with both hands.

The invention described here allows a high degree of ergonomics and a high level of safety against unintentional operation to be achieved at the same time, especially when capacitive sensors are used.

REFERENCE SIGNS

Control unit 10
Housing 11
User surface 13
Operating element 14
Longitudinal axis (of the operating element) 14*z*
Handle 15
Lever section (of the operating element) 16
Handle section (of the operating element) 18
Distal cover surface 18*d*
Peripheral surface 18*u*
Longitudinal axis (of the handle section) 18*z*
Bellows 19
Activation sensor 20
Sensor electronics 21
Effective sensor range 22
Processor device 30

The invention claimed is:

1. A control unit for a remote control for controlling a machine, preferably for a radio remote control, comprising: a processor device,
at least one manually operable operating element for controlling at least one machine function, which can be switched over by the processor device between an activated state (b) and a deactivated state (a),
an activation sensor associated with the operating element, the activation sensor comprising an effective sensor range and being adapted to detect a defined approach to the effective sensor range by a body portion of an operator, the processor device being adapted to switch the operating element to the activated state (b) if the activation sensor detects the defined approach to the effective sensor range, and to switch the operating element to the deactivated state (a) when no defined approach to the effective sensor range is detected by the activation sensor during a preset period of time,
and the control unit being set up such that operation of the operating element does not cause activation of the machine function, as long as the operating element is in the deactivated state (a),
characterized in that a position or/and size of the effective sensor range on the control unit is variable.

2. A control unit according to claim 1,
characterized in that a configuration of the effective sensor range, with respect to its position and/or size on the operating element, can be switched by the processor device between a basic configuration assigned to the deactivated state (a) of the operating element and a working configuration different from the basic configuration and assigned to the activated state (b) of the operating element, and wherein the processor device is further adapted to switch the configuration of the effective sensor range to the configuration of the basic configuration and the working configuration assigned to that state, upon or after switching the operating element to a state of the activated state (b) and the deactivated state (a).

3. A control unit according to claim 1,
characterized in that the activation sensor is a capacitive sensor.

4. A control unit according to claim 1,
characterized in that the effective sensor range is an effective sensor surface.

5. A control unit according to claim 2,
characterized in that the effective sensor range of the basic configuration is contained at least partially, preferably completely, in the effective sensor range of the working configuration, or in that the effective sensor range is enlarged when switching from the basic configuration to the working configuration.

6. A control unit according to claim 2,
characterized in that the operating element comprises a handle section having a distal cover surface and a peripheral surface with respect to a longitudinal axis of the handle section, the effective sensor range in the basic configuration being formed by the distal cover surface or a portion thereof, while the effective sensor range in the working configuration comprises at least one area of the peripheral surface and is preferably formed of the distal cover surface and the peripheral surface.

7. A control unit according to claim 6,
characterized in that the operating element is a rotary switch or a joystick switch.

8. A control unit according to claim 2,
characterized in that the control unit comprises a handle adapted to be held or touched by the operator during operation, and wherein the effective sensor range in a working configuration comprises at least a portion of the handle.

9. A control unit according to claim 1, characterized in that the preset period of time is between 0 and 5 seconds inclusive, preferably between 1 and 3 seconds inclusive.

10. A control unit according to claim 1, characterized in that the preset period of time or/and the effective sensor range can be set or modified by the operator.

11. A control unit according to claim 2, characterized in that the working configuration of the effective sensor range can be adjusted or modified by the operator.

12. A control unit according to claim 1, characterized in that it is further adapted to output a signal to the operator when a configuration of the effective sensor range is changed or switched over, preferably a vibration signal.

13. A remote controller for controlling a machine, the remote controller comprising:
a control unit that includes:
a processor device,
at least one manually operable operating element for controlling at least one machine function, which can be switched over by the processor device between an activated state (b) and a deactivated state (a),
an activation sensor associated with the operating element, the activation sensor comprising an effective sensor range and being adapted to detect a defined approach to the effective sensor range by a body portion of an operator, the processor device being adapted to switch the operating element to the activated state (b) if the activation sensor detects the defined approach to the effective sensor range, and to switch the operating element to the deactivated state (a) when no defined approach to the effective sensor range is detected by the activation sensor during a preset period of time,
and the control unit being set up such that operation of the operating element does not cause activation of the machine function, as long as the operating element is in the deactivated state (a),
characterized in that a position or/and size of the effective sensor range on the control unit is variable.

14. A remote controller according to claim 13, wherein the control unit is characterized in that a configuration of the effective sensor range, with respect to its position and/or size on the operating element, can be switched by the processor device between a basic configuration assigned to the deactivated state (a) of the operating element and a working configuration different from the basic configuration and assigned to the activated state (b) of the operating element, and wherein the processor device is further adapted to switch the configuration of the effective sensor range to the configuration of the basic configuration and the working configuration assigned to that state, upon or after switching the operating element to a state of the activated state (b) and the deactivated state (a).

15. A remote controller according to claim 13, wherein the control unit is characterized in that the activation sensor is a capacitive sensor.

16. A remote controller according to claim 14, wherein the control unit is characterized in that the effective sensor range of the basic configuration is contained at least partially, preferably completely, in the effective sensor range of the working configuration, or in that the effective sensor range is enlarged when switching from the basic configuration to the working configuration.

17. A remote controller according to claim 14, wherein the control unit is characterized in that the operating element comprises a handle section having a distal cover surface and a peripheral surface with respect to a longitudinal axis of the handle section, the effective sensor range in the basic configuration being formed by the distal cover surface or a portion thereof, while the effective sensor range in the working configuration comprises at least one area of the peripheral surface and is preferably formed of the distal cover surface and the peripheral surface.

18. A remote controller according to claim 17, wherein the control unit is characterized in that the operating element is a rotary switch or a joystick switch.

19. A remote controller according to claim 15, wherein the control unit comprises a handle adapted to be held or touched by the operator during operation, and wherein the effective sensor range in a working configuration comprises at least a portion of the handle.

20. A remote controller according to claim 13, wherein the control unit is characterized in that the effective sensor range is an effective sensor surface.

* * * * *